US011047118B2

(12) United States Patent
Ridell

(10) Patent No.: US 11,047,118 B2
(45) Date of Patent: Jun. 29, 2021

(54) METHOD FOR INDIVIDUALLY ADJUSTING OUTPUT WATER TEMPERATURE IN A DEVICE COMPRISING MULTIPLE OUTLETS

(71) Applicant: ORBITAL SYSTEMS AB, Malmö (SE)

(72) Inventor: Michael Ridell, Staffanstorp (SE)

(73) Assignee: ORBITAL SYSTEMS AB, Malmö (SE)

( * ) Notice: Subject to any disclaimer, the term of this patent is extended or adjusted under 35 U.S.C. 154(b) by 156 days.

(21) Appl. No.: 16/494,337

(22) PCT Filed: Mar. 12, 2018

(86) PCT No.: PCT/SE2018/050234
§ 371 (c)(1),
(2) Date: Sep. 16, 2019

(87) PCT Pub. No.: WO2018/169474
PCT Pub. Date: Sep. 20, 2018

(65) Prior Publication Data
US 2020/0299940 A1 Sep. 24, 2020

(30) Foreign Application Priority Data
Mar. 15, 2017 (SE) ................................... 1750307-9

(51) Int. Cl.
*E03B 1/04* (2006.01)
*E03C 1/04* (2006.01)
(Continued)

(52) U.S. Cl.
CPC .............. *E03C 1/041* (2013.01); *E03B 1/041* (2013.01); *C02F 2209/02* (2013.01);
(Continued)

(58) Field of Classification Search
CPC ................. F24D 17/0078; E03B 1/041; E03B 2001/045; E03C 2001/005
See application file for complete search history.

(56) References Cited

U.S. PATENT DOCUMENTS 4,359,789 A 11/1982 Roberts
5,564,462 A 10/1996 Storch
(Continued)

FOREIGN PATENT DOCUMENTS

CN 2926333 Y 7/2007
JP 4687539 B2 10/2007

OTHER PUBLICATIONS

International Search Report on application No. PCT/SE2018/050234 dated May 9, 2018.

*Primary Examiner* — Kevin F Murphy
(74) *Attorney, Agent, or Firm* — Moser Taboada

(57) ABSTRACT

The present inventive concept relates to a water recirculating device (100) comprising: a heating arrangement (120); and a flow path divider (122) placed in a water recirculating path (116) upstream from the heating arrangement (120), wherein the flow path divider (122) is arranged to divide the water recirculating path (116) into a heating path (124) and a non-heating path (126); and wherein a first mixing valve (106) is configured to mix water from the heating path (124) having a first temperature and water from the non-heating path (126) having a second temperature in order to form first temperature regulated water, and wherein a second mixing valve (112) is configured to mix water from the heating path (124) having the first temperature with water from the non-heating path (126) having the second temperature in order to form second temperature regulated water.

10 Claims, 3 Drawing Sheets

(51) Int. Cl.
  *E03C 1/00* (2006.01)
  *F24D 17/00* (2006.01)
(52) U.S. Cl.
  CPC ... *E03B 2001/045* (2013.01); *E03C 2001/005* (2013.01); *F24D 17/0078* (2013.01)

(56) References Cited

U.S. PATENT DOCUMENTS

| | | | |
|---|---|---|---|
| 5,913,614 | A | 6/1999 | Smith et al. |
| 6,286,764 | B1 | 9/2001 | Garvey et al. |
| 8,594,853 | B2 * | 11/2013 | McNamara ......... F24D 17/0078 700/282 |
| 9,886,043 | B2 * | 2/2018 | Yuge ................... F24D 17/0026 |
| 2006/0022062 | A1 | 2/2006 | Morris |
| 2008/0196156 | A1 | 8/2008 | Brewin |
| 2017/0145669 | A1 * | 5/2017 | Klicpera ................... E03C 1/00 |
| 2018/0022618 | A1 * | 1/2018 | Bertrand ................. C02F 1/008 210/103 |
| 2019/0003157 | A1 * | 1/2019 | Greidanus ................. E03C 1/00 |

* cited by examiner

# METHOD FOR INDIVIDUALLY ADJUSTING OUTPUT WATER TEMPERATURE IN A DEVICE COMPRISING MULTIPLE OUTLETS

TECHNICAL FIELD

The inventive concept described herein generally relates to the field of water recirculation. More particularly, concepts for individually adjusting output water temperature in a water recirculating device comprising multiple outlets are disclosed.

BACKGROUND

In many parts of the world, water is becoming a scarce commodity. Consequently, systems for purification and recycling of water has found applications across many fields. Conventional water recycling devices can be effective, but are often costly, and requires frequent maintenance and major modifications to existing water infrastructure. In addition, such devices are often adapted solely for a single application, typically in a household setting. There is therefore a need for improved water recirculating devices in terms of cost effectiveness, ease of installation and use, customizability, and adaptation to multiple applications.

SUMMARY OF THE INVENTION

It is an object of the present inventive concept to mitigate, alleviate or eliminate one or more of the above-identified deficiencies in the art and disadvantages singly or in combination.

According to a first aspect of the inventive concept, these and other objects are achieved in full, or at least in part, by a water recirculating device comprising: a first water outlet comprising a first flow restriction valve and a first mixing valve; a second water outlet comprising a second flow restriction valve and a second mixing valve; a water collecting arrangement arranged to collect water output from the first and/or second water outlet; a water recirculating path in liquid communication with and arranged to connect the water collecting arrangement and the first and second water outlet; an external water path in liquid communication with the water recirculating path; a heating arrangement; and a flow path divider placed in the water recirculating path upstream from the heating arrangement, wherein the flow path divider is arranged to divide the water recirculating path into a heating path configured to heat a first volume of water to a first temperature and transport the first volume of water, and a non-heating path configured to transport a second volume of water having a second temperature; wherein the heating arrangement is arranged in the heating path, and wherein the heating path and non-heating path are arranged to connect to the first water outlet via the first mixing valve and to the second water outlet via the second mixing valve, and wherein the first mixing valve is configured to mix water from the heating path having the first temperature and water from the non-heating path having the second temperature in order to form first temperature regulated water, and wherein the second mixing valve is configured to mix water from the heating path having the first temperature with water from the non-heating path having the second temperature in order to form second temperature regulated water.

The water recirculating device may further comprise a stand-by path arranged to form a closed loop via the heating arrangement.

The water recirculating device may further comprise a water treatment arrangement arranged upstream from the flow path divider wherein the water treatment arrangement is configured to treat water from the external water path and/or water from the water collecting arrangement.

The stand-by path may be further arranged to form a closed loop via the heating arrangement and the water treatment arrangement.

The stand-by-path may be arranged to connect upstream and downstream of the heating arrangement.

The device may be a hair washing device.

The water recirculating device may further comprise a first user input interface configured to control the first mixing valve such that a temperature of the first temperature regulated water can be controlled, and a second user input interface configured to control the second mixing valve such that a temperature of the second temperature regulated water can be controlled.

The first and second mixing valve may be configured to be adjusted independently with respect to each other, such that a temperature of the first temperature regulated water can be adjusted independently with respect to a temperature of the second temperature regulated water.

According to a second aspect of the inventive concept, these and other objects are achieved in full, or at least in part, by a method for individually adjusting output water temperature in a device comprising: a first water outlet comprising a first flow restriction valve and a first mixing valve; a second water outlet comprising a second flow restriction valve and a second mixing valve; a water collecting element arranged to collect water output from the first and/or second water outlet; a water recirculating path in liquid communication with and arranged to connect the water collecting element and the first and second water outlet; an external water path in liquid communication with the water recirculating path; a heating arrangement; and a flow path divider placed in the water recirculating path upstream from the heating arrangement, wherein the flow path divider is arranged to divide the water recirculating path into a heating path configured to heat a first volume of water to a first temperature and transport the first volume of water, and a non-heating path configured to transport a second volume of water having a second temperature; wherein the heating arrangement is arranged in the heating path, and wherein the heating path and non-heating path are arranged to connect to the first water outlet via the first mixing valve and to the second water outlet via the second mixing valve, wherein the method comprises the steps of: via the first mixing valve, mixing water from the heating path having the first temperature with water from the non-heating path having the second temperature in order to form first temperature regulated water; and via the second mixing valve, mixing water from the heating path having the first temperature with water from the non-heating path having the second temperature in order to form second temperature regulated water.

The water collecting arrangement of the second aspect may be a water collecting arrangement as described in the first aspect of the inventive concept. Further, the external water input path of the second aspect may be an external water path as described in the first aspect of the inventive concept.

The device may further comprise a stand-by path arranged to form a closed loop via the heating arrangement, wherein the method further comprises the step of recirculating water from the heating path having the second temperature to the heating arrangement via the stand-by path if the first and second flow restriction valve is set to restrict a flow of water to said first and second water outlet respectively.

The device may further comprise a water treatment arrangement arranged in the recirculation path upstream of the heating arrangement, wherein the method further comprises the step of: treating water from the external water path and/or water from the water collecting arrangement.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

DETAILED DESCRIPTION

The present disclosure relates to water recirculating devices. Initially, some terminology may be defined to provide clarification for the following disclosure.

Throughout the present disclosure, reference is made to different paths. Such paths may be for example pipes for transporting water.

In general, the inventive concept is based on the realization that a water recirculating device can recirculate water collected from multiple outlets through a recirculating path, and that water output from the multiple outlets can have its respective temperature adjusted individually. In other words, multiple outlets may share the same heating arrangement and/or water treatment arrangement.

Figure 1:
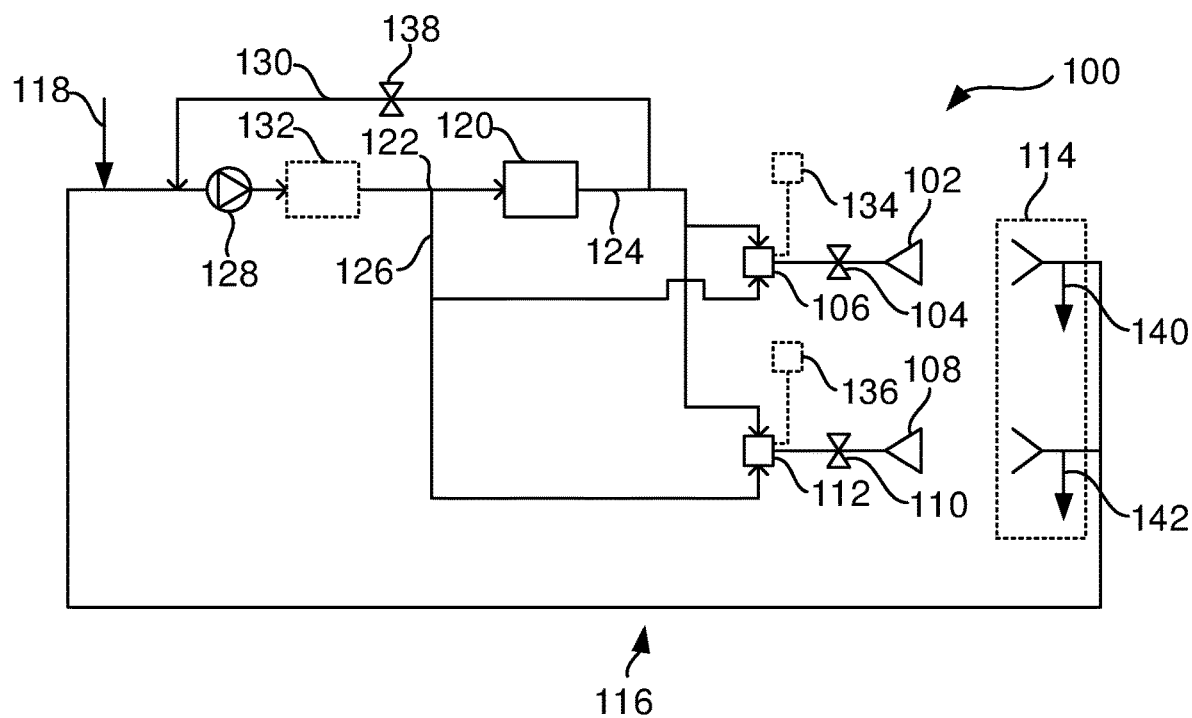
FIG. 1 schematically illustrates a water recirculating device.

With reference to FIG. 1, a water recirculating device 100 may comprise a first water outlet 102 comprising a first flow restriction valve 104 and a first mixing valve 106; a second water outlet 108 comprising a second flow restriction valve 110 and a second mixing valve 112; a water collecting arrangement 114 arranged to collect water output from the first and/or second water outlet 102, 108; a water recirculating path 116 in liquid communication with and arranged to connect the water collecting arrangement 114 and the first and second water outlet 102, 108; an external water path 118 in liquid communication with the water recirculating path 116; a heating arrangement 120; and a flow path divider 122 placed in the water recirculating path upstream from the heating arrangement 120, wherein the flow path divider 122 is arranged to divide the water recirculating path 116 into a heating path 124 configured to heat a first volume of water to a first temperature and transport the first volume of water, and a non-heating path 126 configured to transport a second volume of water having a second temperature; wherein the heating arrangement 120 is arranged in the heating path 124, and wherein the heating path 124 and non-heating path 126 are arranged to connect to the first water outlet 102 via the first mixing valve 106 and to the second water outlet 108 via the second mixing valve 112, and wherein the first mixing valve 106 is configured to mix water from the heating path 124 having the first temperature and water from the non-heating path 126 having the second temperature in order to form first temperature regulated water, and wherein the second mixing valve 112 is configured to mix water from the heating path 124 having the first temperature with water from the non-heating path 126 having the second temperature in order to form second temperature regulated water.

The recirculating path 116 may comprise a circulation pump 128. The circulation pump 128 may provide a flow of water in the water recirculating device 100.

The device 100 may comprise a stand-by path 130 arranged to form a closed loop via the heating arrangement 120. In other words, the stand-by path 130 may connect upstream and downstream of the heating arrangement 120. The stand-by path 130 may comprise a valve 138 configured to control a flow of water through the stand-by path 130.

The device 100 may comprise a water treatment arrangement 132 arranged upstream from the flow path divider 122. The water treatment arrangement 132 may be configured to treat water from the external water path 118 and/or water from the water collecting arrangement. The stand-by path 130 may be arranged to form a closed loop via the heating arrangement 120 and the water treatment arrangement 132. In other words, the stand-by path may connect upstream of the water treatment arrangement 132 and downstream of the heating arrangement 120. The water treatment arrangement 132 may be arranged downstream of the external water path 118

The device 100 may comprise a first user input interface 134 configured to control the first mixing valve 106 such that a temperature of the first temperature regulated water can be controlled, and a second user input interface 136 configured to control the second mixing valve 112 such that a temperature of the second temperature regulated water can be controlled. The first and second mixing valve may be configured to be controlled by a motor. The first and second user input interface 134, 136 may be a digital interface.

The first and second mixing valve 106, 112 may be configured to be adjusted independently with respect to each other, such that the temperature of the first temperature regulated water can be adjusted independently with respect to the temperature of the second temperature regulated water.

The stand-by path 130 may provide for that water can be looped via the heating arrangement 120, such that water having the first temperature is formed. This effect may be provided even if the first and second flow restriction valves 104, 110 are set to restrict or completely restrict a flow of water out of the first and second water outlet 102, 108. In other words, the stand-by path 130 may provide for that the device comprises water having the first temperature even if the first and second flow restriction valves 104, 110 are set to restrict or completely restrict a flow of water out of the first and second water outlet 102, 108. An advantage with this arrangement is that the device may be more responsive to a user input to the first and/or second mixing valve 106, 112 after a period of downtime. The period of downtime should here be understood to mean a period of time wherein a flow of water out of the first and second water outlet 102, 108 is restricted or completely restricted.

The water collecting arrangement 114 may comprise a first and a second water collecting element arranged to collect water from the first and second water outlet 102, 108 respectively. The water collecting arrangement 114 may comprise a first and second discharge path 140, 142 configured to discharge water collected by the first and second water collecting element respectively from the device 100. The water collecting arrangement 114 may comprise a discharge path configured to discharge water collected by the water collecting arrangement 114 from the device 100.

The device 100 may comprise a sensor arrangement configured to detect a number of substances in water collected by the water collecting arrangement 114 and/or in external water input via the external water path 118. Such a substance may comprise a hair dye, a shampoo, a conditioner, or the like. The water collecting arrangement 114 may be configured to discharge water via the discharge path and/or the first discharge path 140 and/or the second discharge path 142 if a level of at least one of the number of substances is determined by the sensor arrangement to be over a threshold level. If water is discharged from the device 100, external water may be input to the device 100 via the external water path 118 in order to maintain a flow of water out of the first and/or second water outlet 102, 108. The sensor arrangement may be arranged in the water collecting arrangement 114. The sensor arrangement may comprise an electrical conductivity sensor. The sensor arrangement may comprise a pH sensor. The sensor arrangement may comprise a turbidity sensor.

The device may comprise a first temperature sensor arranged in the heating path 124 downstream of the heating arrangement 120, wherein the first temperature sensor is configured to determine a temperature of water heated by the heating arrangement 120. In other words, the first temperature sensor may be configured to determine the first temperature.

The device may comprise a second temperature sensor arranged in the non-heating path 126. The second temperature sensor may be configured to determine a temperature of water diverted to the non-heating path 126 via the flow path divider 122. In other words, the second temperature sensor may be configured to determine the second temperature.

The following is an example of how the device 100 may operate. A first target temperature of the first temperature regulated water may be input via the first user input interface 134 to the first mixing valve 106. The first mixing valve 106 may then control a ratio of water from the heating path 124 having the first temperature and water from the non-heating path 126 having the second temperature in order to form first temperature regulated water having the first target temperature. In other words, the first mixing valve 106 may be configured to control a ratio of water from the heating path 124 having the first temperature and water from the non-heating path 126 having the second temperature in order to form first temperature regulated water having the first target temperature.

The first temperature sensor may determine the first temperature of water in the heating path 124 and the second temperature sensor may determine the second temperature of water in the non-heating path 126. Hereby, the first mixing valve 106 may be provided with data related to the first and second temperature. The first mixing valve 106 may thus adjust the ratio of water having the first temperature and water having the second temperature in order to form first temperature regulated water having the first target temperature. First temperature regulated water may subsequently be output via the first water outlet 102.

The same principles as what has been disclosed in the sections above may be applied to the second mixing valve 112 and the second water outlet 108.

Figure 2:
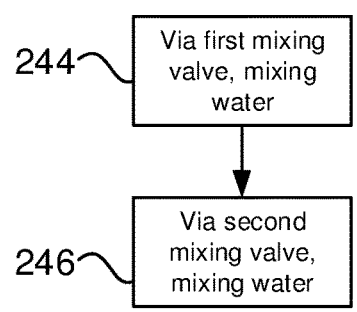
FIG. 2 is a flow chart diagram of a method for individually adjusting output water temperature in a device.

Referring now to FIG. 2, a method for individually adjusting output water temperature in a device comprising: a first water outlet comprising a first flow restriction valve and a first mixing valve; a second water outlet comprising a second flow restriction valve and a second mixing valve; a water collecting arrangement arranged to collect water output from the first and/or second water outlet; a water recirculating path in liquid communication with and arranged to connect the water collecting arrangement and the first and second water outlet; an external water path in liquid communication with the water recirculating path; a heating arrangement; and a flow path divider placed in the water recirculating path upstream from the heating arrangement, wherein the flow path divider is arranged to divide the water recirculating path into a heating path configured to heat a first volume of water to a first temperature and transport the first volume of water, and a non-heating path configured to transport a second volume of water having a second temperature; wherein the heating arrangement is arranged in the heating path, and wherein the heating path and non-heating path are arranged to connect to the first water outlet via the first mixing valve and to the second water outlet via the second mixing valve, may comprise the steps of via the first mixing valve, mixing water from the heating path 244 having the first temperature with water from the non-heating path having the second temperature in order to form first temperature regulated water; and via the second mixing valve, mixing water from the heating path 246 having the first temperature with water from the non-heating path having the second temperature in order to form second temperature regulated water.

Referring now to FIGS. 3a-3d, various arrangements of a heat exchanging arrangement in a water recirculating device 300 are illustrated. For the sake of clarity in the illustrations, the standby path has been omitted from the figures. A heat exchanging arrangement may provide for that water in the non-heating path 326 is kept at a lower temperature than water in the heating-path 324. In a scenario where water is collected by the water collecting arrangement 314 and subsequently recirculated in the water recirculating device 300, and no external water is input via the external water path 318, the first and second temperature regulated water may be hindered from achieving a temperature lower than a temperature of the collected water. The first and second temperature regulated water may also be limited to a lowest temperature resulting from the ratio of collected water and external water, depending on the temperature of the collected water and external water. The heat exchanging arrangement may provide for that a temperature of water in the device can be lowered. In particular, it may be preferable to lower a temperature of water in the non-heating path 326. The first and second mixing valves 306, 312 may in the illustrated arrangements be thermostatic mixing valves.

Figure 3A:
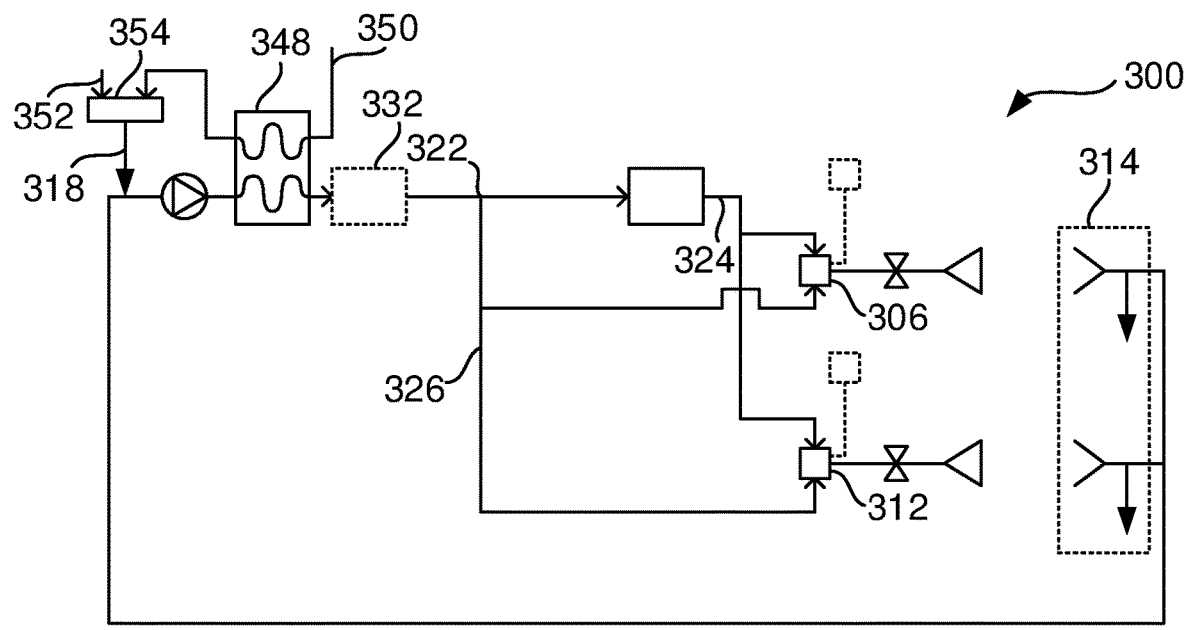
FIGS. 3a-3d illustrate arrangements of a heat exchanging arrangement in a water recirculating device.
Figure 3B:
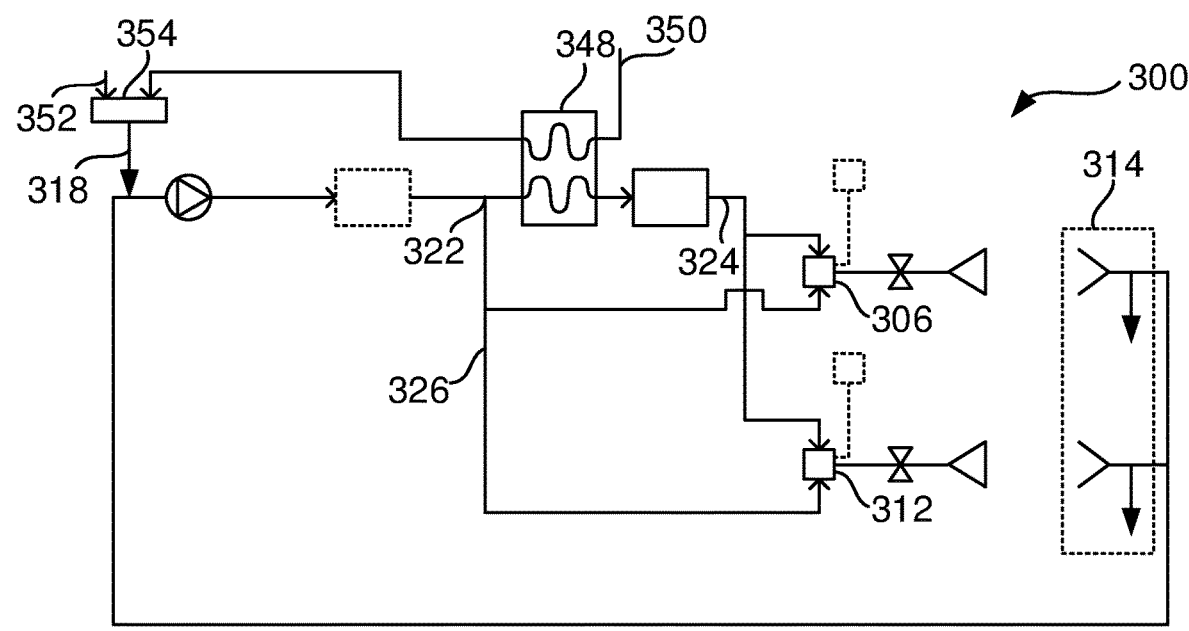
Figure 3C:
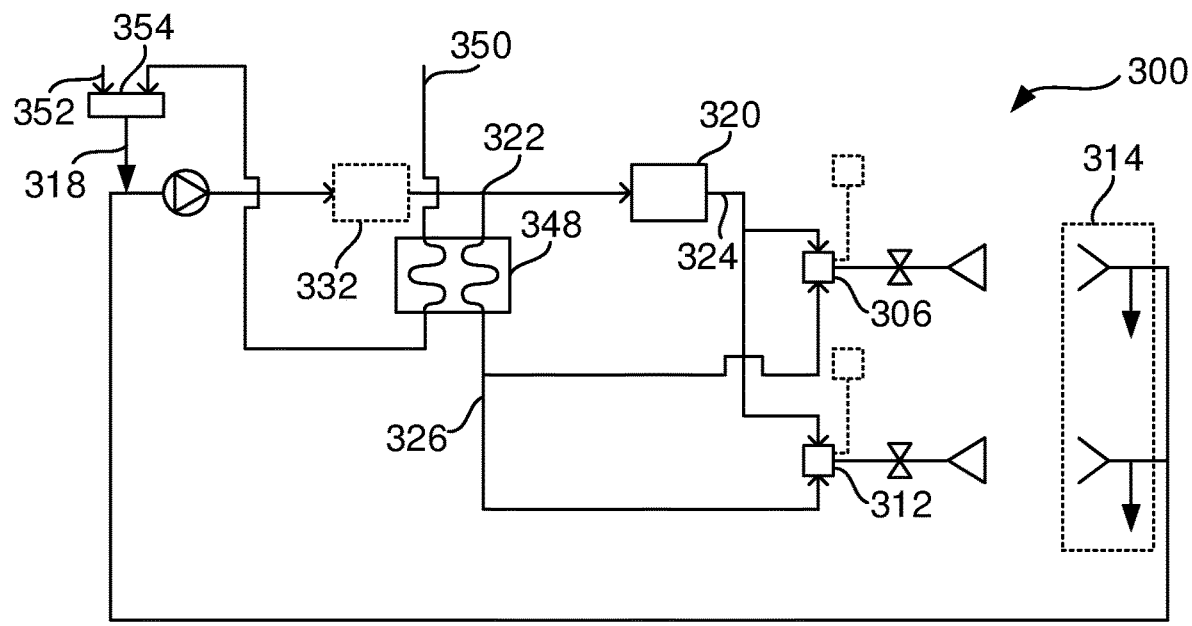

In the arrangements of FIGS. 3a-3c, cold water is input to one side of the heat exchanging arrangement via a cold water path 350. The cold water is then directed to a mixing valve 354. Hot water may also be directed to the mixing valve via a hot water path 352. The hot water and the cold water may via the mixing valve 354 be directed into the external water path 318.

FIG. 3a illustrates a heat exchanging arrangement 348 arranged upstream of the flow path divider 322. The heat exchanging arrangement 348 is here arranged upstream of the water treatment arrangement 332. Hereby, a temperature of the water entering the water treatment arrangement 332 may be lowered before entering the water treatment arrangement 332. This may be beneficial with respect to reducing or counteracting microbiological growth. However, it is also contemplated that the heat exchanging arrangement 348 may be arranged downstream of the water treatment arrangement 332 and upstream of the flow path divider 322.

FIG. 3b illustrates a heat exchanging arrangement 348 arranged downstream of the flow path divider 322 in the heating path 324.

FIG. 3c illustrates a heat exchanging arrangement 348 arranged downstream of the flow path divider 322 in the non-heating path 326. An advantage with this arrangement is that water passing the heater 320 in the heating path 324 will not have its temperature lowered by the heat exchanging arrangement 348.

Figure 3D:
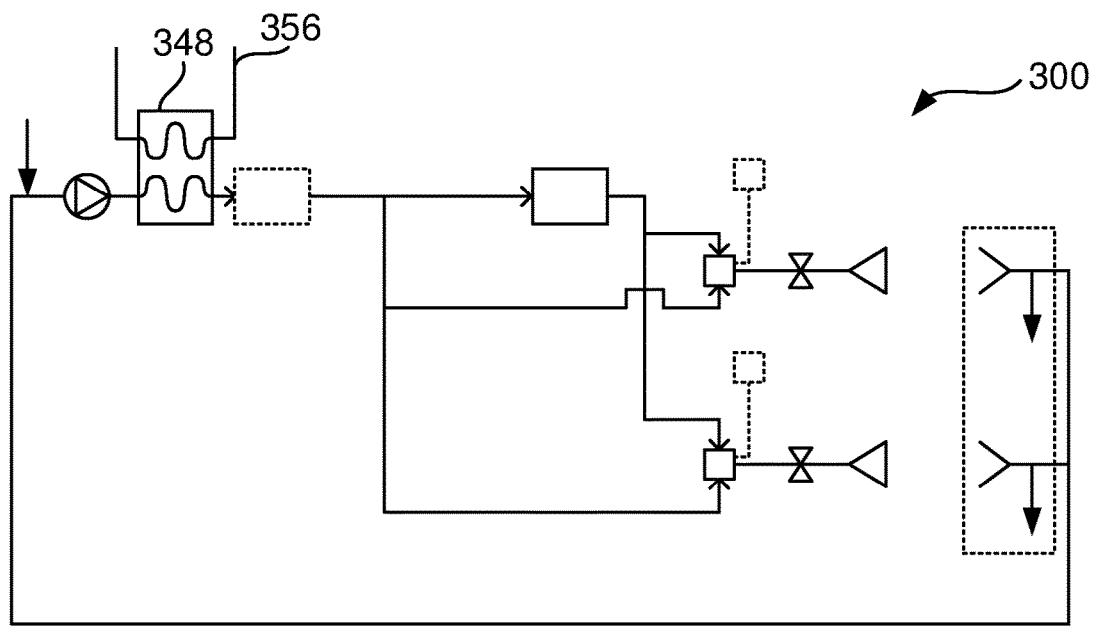

It is also contemplated that the heat exchanging arrangement 348 need not necessarily be connected to cold water via the cold water path 350 as illustrated in FIGS. 3a-3c. As illustrated in FIG. 3d, the heat exchanging arrangement 348 may be connected to an external source of medium via an external medium path 356, wherein the medium is capable of removing heat from water in the water recirculating device 300 via the heat exchanging arrangement 348. The heat exchanging arrangement 348 may also, in addition or alternatively, comprise an active cooling component such as a thermoelectric cooling component, in order to lower the temperature of water in the water recirculating device 300.

As is readily understood by the person skilled in the art, the heat exchanging arrangement 348 illustrated in FIG. 3d may also be arranged at corresponding locations as described in conjunction with FIGS. 3b-3c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF REFERENCE SIGNS

100 Water recirculating device
102 First water outlet
104 First flow restriction valve
106 First mixing valve
108 Second water outlet
110 Second flow restriction valve
112 Second mixing valve
114 Water collecting arrangement
116 Water recirculating path
118 External water path
120 Heating arrangement
122 Flow path divider
124 Heating path
126 Non-heating path
128 Circulation pump
130 Stand-by path
132 Water treatment arrangement
134 First user input interface
136 Second user input interface
138 Valve
140 First discharge path
142 Second discharge path
244 Step of, via the first mixing valve, mixing water
246 Step of, via the second mixing valve, mixing water
300 Water recirculating device
306 First mixing valve
312 Second mixing valve
314 Water collecting arrangement
318 External water path
320 Heating arrangement
322 Flow path divider
324 Heating path
326 Non-heating path
332 Water treatment arrangement
348 Heat exchanging arrangement
350 Cold water path
352 Hot water path
354 Mixing valve
356 External medium path

The invention claimed is:
1. A water recirculating device comprising:
a first water outlet comprising a first flow restriction valve and a first mixing valve;
a second water outlet comprising a second flow restriction valve and a second mixing valve;
a water collecting arrangement arranged to collect water output from the first and/or second water outlet;
a water recirculating path in liquid communication with and arranged to connect the water collecting arrangement and the first and second water outlet;
an external water path in liquid communication with the water recirculating path;
a heating arrangement; and
a flow path divider placed in the water recirculating path upstream from the heating arrangement, wherein the flow path divider is arranged to divide the water recirculating path into a heating path configured to heat a first volume of water to a first temperature and transport the first volume of water, and a non-heating path configured to transport a second volume of water having a second temperature;
wherein the heating arrangement is arranged in the heating path, and wherein the heating path and non-heating path are arranged to connect to the first water outlet via the first mixing valve and to the second water outlet via the second mixing valve, and wherein the first mixing valve is configured to mix water from the heating path having the first temperature and water from the non-heating path having the second temperature in order to form first temperature regulated water, and wherein the second mixing valve is configured to mix water from the heating path having the first temperature with water from the non-heating path having the second temperature in order to form second temperature regulated water.

2. The water recirculating device according to claim 1, further comprising a stand-by path arranged to form a closed loop via the heating arrangement.

3. The water recirculating device according to claim 2, wherein the stand-by path is further arranged to form a closed loop via the heating arrangement and a water treatment arrangement.

4. The water recirculating device according to claim 2, wherein the stand-by-path is arranged to connect upstream and downstream of the heating arrangement.

5. The water recirculating device according to claim 1, further comprising a water treatment arrangement arranged upstream from the flow path divider wherein the water treatment arrangement is configured to treat water from the external water path and/or water from the water collecting arrangement.

6. The water recirculating device according to claim 1, further comprising a first user input interface configured to control the first mixing valve such that a temperature of the first temperature regulated water can be controlled, and a second user input interface configured to control the second mixing valve such that a temperature of the second temperature regulated water can be controlled.

7. The water recirculating device according to claim 1, wherein the first and second mixing valve are configured to be adjusted independently with respect to each other, such that a temperature of the first temperature regulated water can be adjusted independently with respect to a temperature of the second temperature regulated water.

8. A method for individually adjusting output water temperature in a device comprising: a first water outlet comprising a first flow restriction valve and a first mixing valve; a second water outlet comprising a second flow restriction valve and a second mixing valve; a water collecting arrangement arranged to collect water output from the first and/or second water outlet; a water recirculating path in liquid communication with and arranged to connect the water collecting arrangement and the first and second water outlet; an external water path in liquid communication with the water recirculating path; a heating arrangement; and a flow path divider placed in the water recirculating path upstream from the heating arrangement, wherein the flow path divider is arranged to divide the water recirculating path into a heating path configured to heat a first volume of water to a first temperature and transport the first volume of water, and a non-heating path configured to transport a second volume of water having a second temperature;
  wherein the heating arrangement is arranged in the heating path, and wherein the heating path and non-heating path are arranged to connect to the first water outlet via the first mixing valve and to the second water outlet via the second mixing valve, wherein the method comprises the steps of:
  via the first mixing valve, mixing water from the heating path having the first temperature with water from the non-heating path having the second temperature in order to form first temperature regulated water; and
  via the second mixing valve, mixing water from the heating path having the first temperature with water from the non-heating path having the second temperature in order to form second temperature regulated water.

9. The method according to claim 8, wherein the device further comprises a stand-by path arranged to form a closed loop via the heating arrangement, wherein the method further comprises the step of
  recirculating water from the heating path having the second temperature to the heating arrangement via the stand-by path if the first and second flow restriction valve are set to restrict a flow of water to said first and second water outlet respectively.

10. The method according to claim 8, wherein the device further comprises a water treatment arrangement arranged in the recirculation path upstream of the heating arrangement, wherein the method further comprises the step of:
  treating water from the external water path and/or water from the water collecting arrangement.

* * * * *